United States Patent
Kume et al.

[11] Patent Number: 6,132,110
[45] Date of Patent: Oct. 17, 2000

[54] PIVOTALLY MOUNTED LENS COVER FOR A MOVEABLE LENS BARREL CAPABLE OF BEING SEPARATED FROM THE LENS BARREL UPON THE OCCURRENCE OF AN EXTERNAL FORCE TO PROTECT THE COUPLING MECHANISM FROM BREAKAGE

[75] Inventors: Hideaki Kume; Takaaki Ue; Yasuo Asakura, all of Hachioji; Tatsuya Suzuki, Tokyo, all of Japan

[73] Assignee: Olympus Optical Co., Ltd., Tokyo, Japan

[21] Appl. No.: 09/050,339

[22] Filed: Mar. 30, 1998

[30] Foreign Application Priority Data

Apr. 1, 1997 [JP] Japan ................................. 9-082926
Apr. 2, 1997 [JP] Japan ................................. 9-083176

[51] Int. Cl.$^7$ ............................................... G03B 17/24
[52] U.S. Cl. .................................... 396/349; 396/448
[58] Field of Search ............................ 396/348, 349, 396/439, 448

[56] References Cited

U.S. PATENT DOCUMENTS 5,250,973  10/1993  Pijlman ................................ 396/535

FOREIGN PATENT DOCUMENTS 57-116933  7/1982  Japan .
61-31308  9/1986  Japan .
3-47536  5/1991  Japan .
63-26832  2/1998  Japan .

*Primary Examiner*—David M. Gray
*Attorney, Agent, or Firm*—Louis Weinstein

[57] ABSTRACT

A camera comprises a fixed lens barrel including a moving lens barrel moveable to a collapsed position for non-photography and to a thrust position for photography, and a lens cover capable of pivoting with support shafts, which lie parallel to a plane substantially perpendicular to the optical axis of a photography lens, as a center so as to move to a closed position at which at least part of the face of the photography lens is shielded and to an open position at which the face of the photography lens is exposed. When the lens cover is open, if an external force is applied in a direction in which the lens cover is further opened, the lens cover separates from the support shafts. The support shafts are formed with two shaft members whose distal portions are formed with tapered surfaces and which are constrained to move in directions in which they are separated from each other.

30 Claims, 8 Drawing Sheets

PIVOTALLY MOUNTED LENS COVER FOR A MOVEABLE LENS BARREL CAPABLE OF BEING SEPARATED FROM THE LENS BARREL UPON THE OCCURRENCE OF AN EXTERNAL FORCE TO PROTECT THE COUPLING MECHANISM FROM BREAKAGE

BACKGROUND OF THE INVENTION

1. Field of the Invention

The present invention relates to a camera, or more particularly, a camera having a lens cover for shielding and protecting the face of a photography lens so that the face of the photography lens can be opened or closed freely.

2. Related Background Art

In the past, various kinds of cameras for carrying out photography, in which a lens cover that may be referred to as a lens barrier protects the face of a photography lens by shielding the face of a fixed lens barrel so that the face of the fixed lens barrel can be opened or closed freely, have been proposed and generally used in practice.

For example, a camera described in Japanese Unexamined Utility Model Publication No. 63-26832 is such that: a fixed lens barrel capable of being freely stowed in a camera body or thrust from it is provided with a vertically-bisected lens cover; and the lens cover is opened or closed responsively to stowing or thrusting of the fixed lens barrel.

Moreover, a camera described in Japanese Unexamined Utility Model Publication No. 57-116933 has a lens cover for flatly closing the face of a fixed lens barrel at the time of stowing the fixed lens barrel capable of being freely stowed in a camera body or thrust from it. When the fixed lens barrel moves from a collapsed position to a photographic position, the lens cover pivots with the lower end of the camera body as a shaft center and withdraws from the face of the photography lens.

Japanese Examined Utility Model Publication No. 61-31308 describes a camera in which a fixed lens barrel is designed to be able to be freely stowed in a camera body or thrust from it, and a bi-directionally opening lens cover for flatly closing the face of the fixed lens barrel at the time of stowing the fixed lens barrel is attached to a camera body separately from the fixed lens barrel.

Furthermore, a camera having a collapsible fixed lens barrel which is described in Japanese Unexamined Utility Model Publication No. 3-47536 is such that a lens cover that is created by bisecting a round member substantially in the center of the round member is located in the vicinity of the face of a fixed lens barrel so that when the lens cover is constrained to move in a direction in which the lens cover is closed by means of a spring, the lens cover can pivot freely vertically.

When the fixed lens barrel moves from a collapsed position to a photographic position, the lens cover is pressed by the fixed lens barrel against the constraining force of the spring, and bisected up and down to expose the face of a photography lens. Moreover, when the fixed lens barrel moves from the photographic position to the collapsed position, the lens cover closes the face of the photography lens due to the constraining force of the spring.

However, the means disclosed in the Japanese Unexamined Utility Model Publication No. 63-26832 requires incorporation of a mechanism for driving the lens barrier in the lens barrel. This poses a problem that the incorporation of the mechanism makes the inner structure of the lens barrel complex and increases the outer dimensions thereof.

Moreover, the means disclosed in the Japanese Unexamined Utility Model Publication Nos. 63-26832 and 57-116933, the Japanese Examined Utility Model Publication No. 61-31308, and the Japanese Unexamined Utility Model Publication No. 3-47536 have a problem that when the camera is brought to a photographic state, since the lens cover juts out of a camera body, the operability for carrying out photography is impaired.

Furthermore, there is a problem that when the camera is carried or in use, if the lens cover juts out of the camera body, the lens cover may be hit at something or that when the camera is held by grabbing the lens cover alone, the coupler for coupling the lens cover with the camera is likely to be broken. For overcoming this drawback, it is conceivable to sufficiently reinforce the coupler for coupling the lens cover with the camera so as to prevent the coupler from being broken readily. In this case, a member forming the coupler gets too large to be used in practice.

As described in the Japanese Unexamined Utility Model Publication No. 3-47536, the collapsible camera in which the fixed lens barrel is moved to different positions between a non-photographic state and photographic state may be designed so that the lens cover is stowed in the fixed lens barrel. In this case, there arises a problem that the outer diameter of the fixed lens barrel gets so large as to deteriorate operability.

By the way, conventionally, when photography is carried out, an accessory, for example, a filter or the like for giving special effects to a result of photography or removing harmful light rays may be attached to the face of a photography lens.

Some kind of filter may always be attached to the face of the photography lens during photography in order also to protect the face of the photography lens.

After photography is completed, when the camera is preserved or carried, the lens cover is closed. At this time, it is found a nuisance to detach the frequently used filter every time the camera is preserved or carried.

However, the means disclosed in the Japanese Unexamined Utility Model Publication No. 57-116933 does not take account of the fact that the filter or the like may be attached to the front end of the lens barrel. When a front cover is closed with, for example, the filter or the like attached to the front end of the lens barrel, the filter abuts on the front cover. The front cover may not be able to be closed firmly.

Moreover, the means disclosed in the Japanese Examined Utility Model Publication No. 61-31308 and the Japanese Unexamined Utility Model Publication No. 3-47536 do not, like the means disclosed in the Japanese Unexamined Utility Model Publication No. 57-116933, take account of the fact that the filter or the like may be attached to the front end of the lens barrel. There is therefore a problem that the lens cover cannot be closed with the filter or the like having a certain thickness attached. In this case, the filter mounted or the like must be removed every time the lens cover must be closed. An extra annoying operation is required.

In the means disclosed in the Japanese Unexamined Utility Model Publication No. 57-116933, Japanese Examined Utility Model Publication No. 61-31308, and Japanese Unexamined Utility Model Publication No. 3-47536, when consideration is taken into the fact that a filter or the like may be attached to the front end of the lens barrel, the space between the lens and cover or the like may be increased by the thickness of the filter or the like. In this case, there arises a problem that the lens barrel or camera body gets too large. For preventing the lens barrel or camera from getting large in size, there is no means except that the filter is attached to the outer side of the lens cover, that is, the object-side thereof.

SUMMARY OF THE INVENTION

The first object of the present invention is to provide a camera in which even when the camera is brought to a photographic state and a lens cover is opened, operability will not be impaired.

Moreover, the second object of the present invention is to provide a camera with a lens cover in which when the camera is carried or used with the lens cover opened, even if the lens cover is hit at something or the camera is held by grabbing the lens cover alone, the lens cover and camera body can be prevented from being broken.

The third object of the present invention is to provide a camera in which even when a filter or the like is attached to the front end of a lens barrel, a lens cover can be closed without any hindrance in order to shield the front end of the fixed lens barrel, the front end of the fixed lens barrel can be protected irrespective of whether or not a filter or the like is attached to the front end of the fixed lens barrel, and the lens barrel or camera itself can be prevented from getting too large.

Furthermore, the fourth object of the present invention is to provide a camera in which when a fixed lens barrel is stowed, the necessity of carrying out an annoying operation, such as, removing an attached filter or the like is obviated to thus contribute to improvement of operability.

Briefly, according to the present invention, there is provided a camera comprising a fixed lens barrel that has a photography lens barrel movable to a collapsed position for non-photography and to a thrust position for photography, and a lens cover capable of pivoting with support shafts, which lie parallel to a plane substantially perpendicular to the optical axis of a photography lens, as a center so as to move to a closed position at which at least part of the face of the photography lens is shielded and to an open position at which the face of the photography lens is exposed. The camera is characterized in that: when the lens cover is open, if an external force is applied in a direction in which the lens cover is further opened, the lens cover is decoupled from the support shafts; and the support shafts are formed with two shaft members having a variable space between them.

Moreover, there is provided a camera comprising: a photography lens movable to a collapsed position for non-photography and to a thrust position for photography; and a lens cover capable of pivoting with support shafts, which lie parallel to a plane substantially perpendicular to the optical axis of the photography lens, as a center so as to move between a closed position at which at least part of the face of the photography lens is shielded and an open position at which the face of the photography lens is exposed; and a supporting member for supporting the support shafts that bear the lens cover and allowing the support shafts to move along the optical axis of the photography lens. The camera is characterized in that the supporting member is constrained to move backward along the optical axis of the photography lens by means of a constraining means.

These and other objects of the present invention and the advantages thereof will be apparent from the description below.

According to the present invention, a camera in which when the camera is brought to a photographic state, if a lens cover is opened, operability will not be impaired can be provided.

Moreover, a camera with a lens cover in which even when the camera is carried or used with the lens cover held open, if the lens cover hits something or the camera is held by grabbing the lens cover alone carelessly, the lens cover and camera body thereof can be prevented from being broken can be provided.

Furthermore, a camera in which even when a filter or the like is attached to the front end of a fixed lens barrel, a lens cover can be closed without any hindrance in order to shield the face of the fixed lens barrel, the front end of the fixed lens barrel can be protected by the lens cover irrespective of whether or not the filter or the like is attached to the front end of the lens barrel, and the lens barrel and camera itself can be prevented from getting too large can be provided.

Furthermore, a camera in which when a fixed lens barrel is stowed, the necessity of carrying out an annoying operation, such as, removing an attached filter or the like can be obviated to thus improve operability can be provided.

DETAILED DESCRIPTION OF THE PREFERRED EMBODIMENTS

Figure 1:
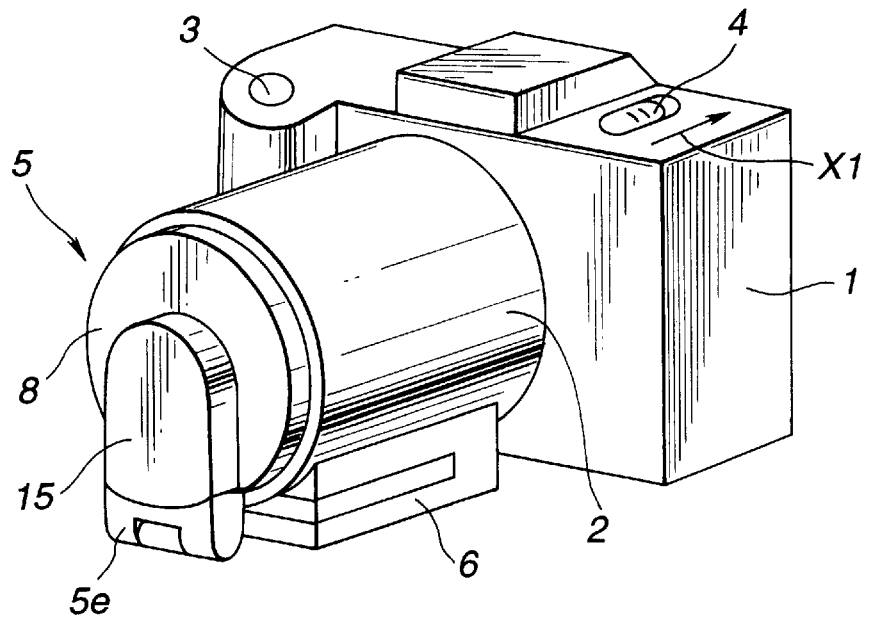
FIG. 1 is a schematic oblique view showing a camera of an embodiment of the present invention in a non-photographic state.
Figure 2:
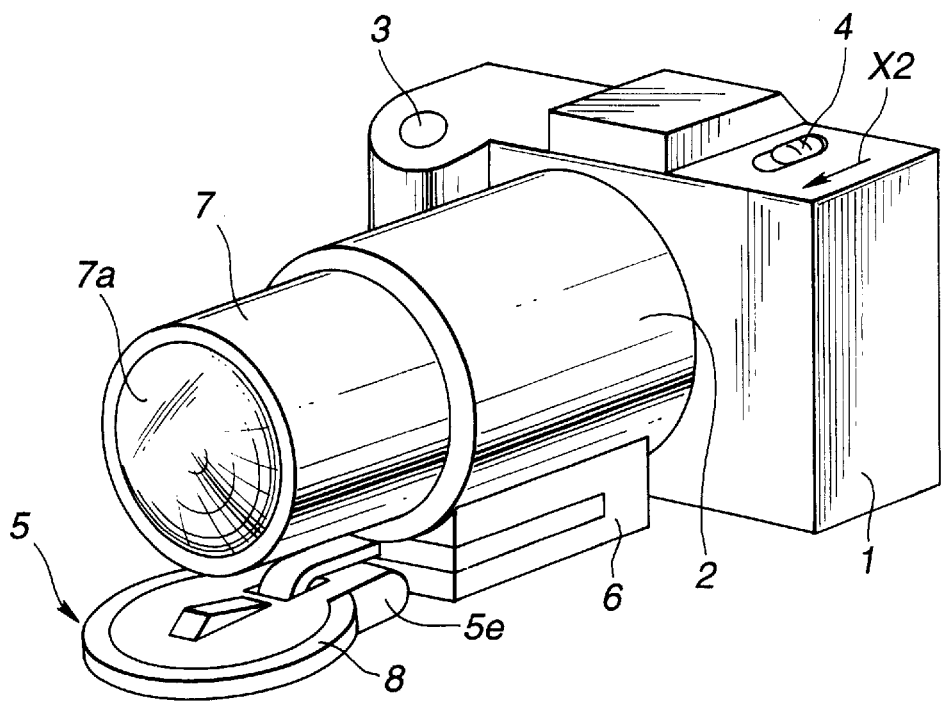
FIG. 2 is a schematic oblique view showing the camera shown in FIG. 1 in a photographic state.

As shown in FIGS. 1 and 2, in a camera of an embodiment of the present invention, a fixed lens barrel 2 is located substantially in the center of the face of a camera body 1. In the fixed lens barrel 2, a moving lens barrel 7 (lens supporting frame) for holding a photography lens 7a is incorporated so that it can thrust or collapse freely.

The moving lens barrel 7 is movable due to a driving force exerted by a drive source (not shown). Specifically, when the camera is brought to a non-photographic state, the moving lens barrel 7 is moved to a collapsed position (See FIG. 1) at which the moving lens barrel is stowed in the fixed lens barrel 2. When the camera is brought to a photographic state, the moving lens barrel 7 is moved to a thrust position (See FIG. 2) at which the moving lens barrel juts out of the face of the fixed lens barrel 2. Owing to the moving lens barrel 7, the photography lens 7a is movable to the collapsed position for non-photography and to the thrust position for photography.

Furthermore, the moving lens barrel 7 moves along the optical axis of the photography lens 7a responsively to power variation (zooming) or focusing performed by the drive source that is not shown.

Moreover, a cover mounting base 6 is attached to the lower outer circumferential part of the fixed lens barrel 2. The cover mounting base 6 is an integral part of a camera body. A lens cover 5 is borne by the lower inner part of the cover mounting base 6 via a sliding member 9 (See FIG. 3) located to be movable along the optical axis of the photography lens 7a so that the lens cover 5 can pivot freely. The sliding member 9 serves as a supporting member for supporting the lens cover 5 so that the lens cover 5 can move along the optical axis of the photography lens.

The lens cover 5 pivots to move to a closed position (See FIG. 1) at which the lens cover shields the face of the moving lens barrel 7 in the fixed lens barrel 2 in the non-photography mode of the camera, and to an open position at which the lens cover exposes the face of the fixed lens barrel 2, and thus protects the face of the photography lens 7a in the fixed lens barrel 2. The lens cover 5 is not limited to a structure for fully shielding the face of the photography lens 7a but may have a structure for shielding part of the face to protect the photography lens.

The lens cover 5 consists of a cover holder 5e including a coupler for coupling the lens cover with the sliding member 9 (See FIG. 3) supported by the cover mounting base 6, a rubber cover 8 having an extension 8d (to be described later) that includes an attachment portion to be attached to the cover mounting base 6, thus attaches the lens cover 5 to the cover mounting base 6, and has elasticity, and a protecting member 15 united with the cover holder 5e and designed to protect the face of the cover rubber 8. The detailed structure of the lens cover 5 and the details of the coupler for coupling the lens cover 5 with the cover mounting base 6 will be explained later.

By the way, various operation members including a main power switch 4 and a shutter release button 3 are formed on the top of the camera body 1.

Moreover, a shutter, a diaphragm, a film wind unit, and the like are incorporated in the camera body 1 and fixed lens barrel 2. The structures of these internal mechanisms have no direct relation to the present invention. The description and illustration of the structures will therefore be omitted.

Next, the structure of the lens cover 5 and the coupler for coupling the lens cover 5 with the cover mounting base 6 will be explained in detail.

Figure 3:
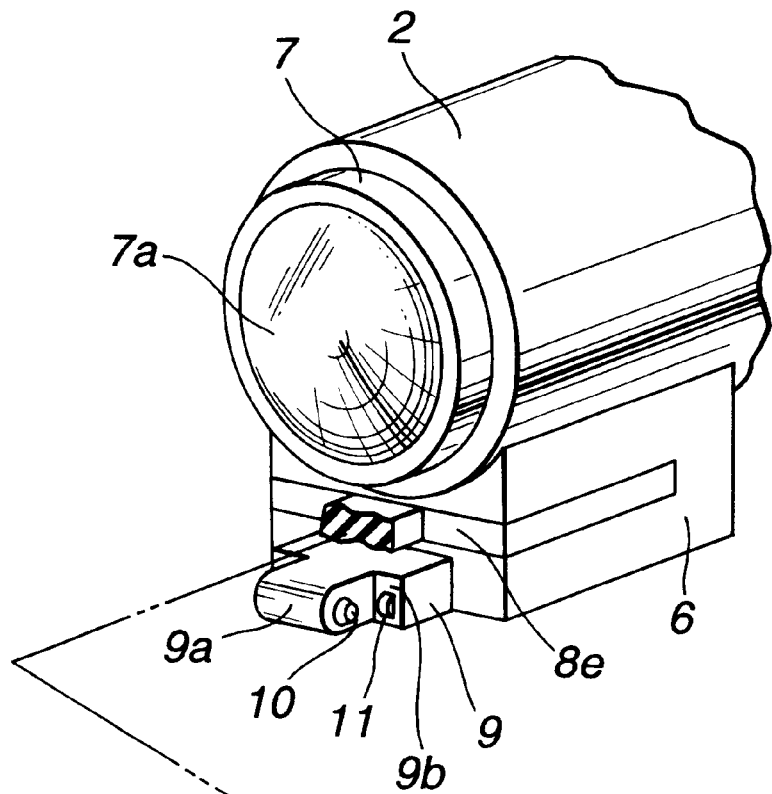
FIG. 3 is an exploded oblique view showing a major portion of the camera shown in FIG. 1 with a lens cover thereof removed.
Figure 3:
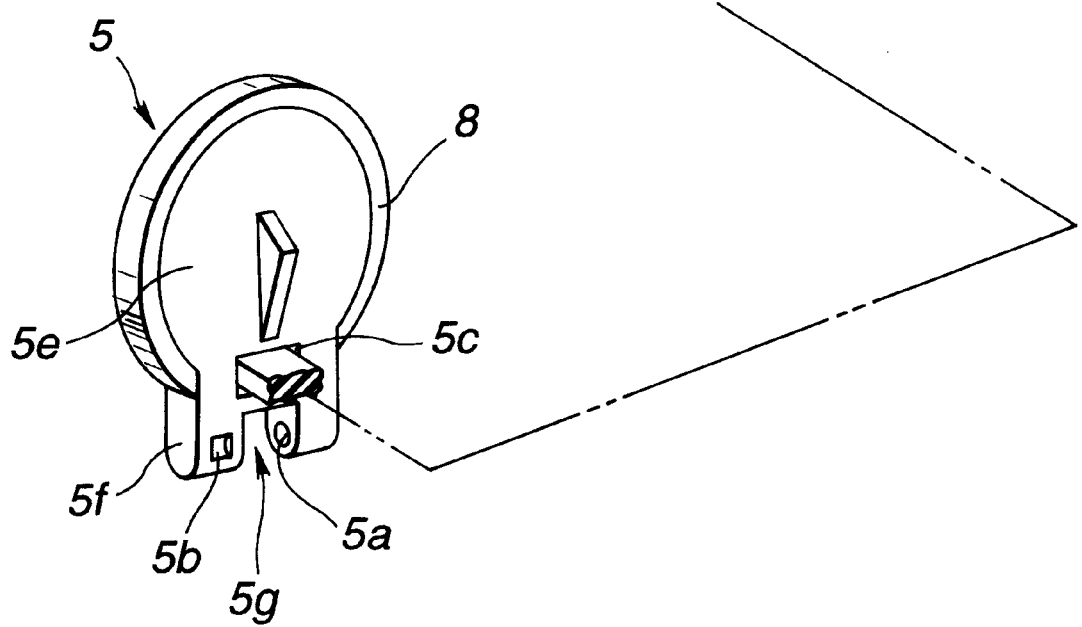

As shown in FIG. 3, the sliding member 9 including a coupling member for bearing the lens cover 5 so that the lens cover can pivot freely so as to couple the lens cover 5 with the cover mounting base 6 is attached to the face of the cover mounting base 6 so that the sliding member 9 can slide along the optical axis of the photography lens 7a owing to a sliding mechanism to be described later.

Figure 5:
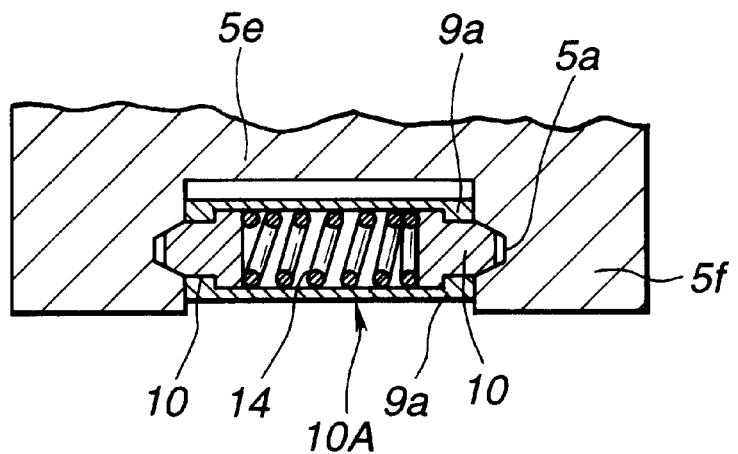
FIG. 5 is a sectional view showing in enlargement a major portion of the camera shown in FIG. 1 which includes a coupler for coupling the lens cover with the cover mounting base.

The front half of the sliding member 9 is provided as a projection 9a whose plane is convex (which looks like a convex when seen from above). Inside the projection 9a, a movable spindle 10A (See FIG. 5) lies in a direction parallel to a plane substantially perpendicular to the optical axis of the photography lens 7a. The movable spindle 10A is, as shown in FIG. 5, structured so that support shafts 10 that are two shaft members can freely jut or sink from or into the side surfaces of the projection 9a with a stretchable spring 14 between them.

The distal portions of the two support shafts 10 are formed with tapered surfaces and constrained to move in directions, in which they are separated from each other, due to a constraining force exerted by the spring 14.

Moreover, a compression spring 16 (See FIGS. 11 and 12) that is an elastic member forming a click stop mechanism that will be described later, and a click boss 11 to be constrained by the compression spring 16 are embedded in a shoulder 9b of a proximal part of the sliding member 9 shown in FIG. 3 which is proximal to the projection 9a, so that the sliding member 9 can slide along the optical axis of the photography lens 7a.

Figure 7:
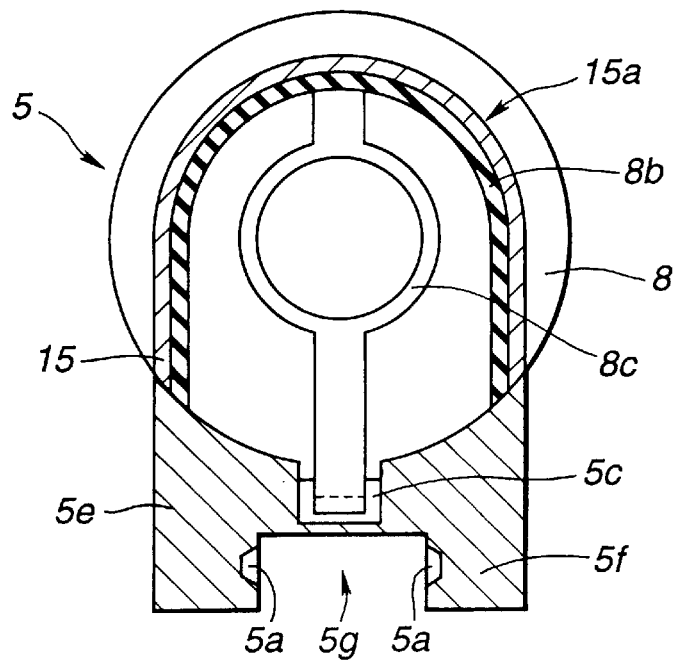
FIG. 7 is a sectional view of the plane indicated with a dot-dash line 71–72–73–74 in FIG. 6.

By the way, as shown in FIGS. 3 and 7, the cover holder 5e that is an integral part of the lens cover 5 is substantially circular shaped. A jutting portion 5f juts downward from part of the outer circumference of the cover holder 5e. A notch 5g having substantially the same width as the projection 9a of the sliding member 9 is formed substantially in the center of the jutting portion 5f. Bearing holes 5a with which the support shafts 10 are engaged are bored in the inner side walls of the jutting portion opening on the notch 5g. The engagement surfaces of the bearing holes 5a are tapered surfaces exactly like the tapered surfaces of the support shafts 10.

When the support shafts 10 are engaged with the bearing holes 5a, the lens cover 5 is coupled with the cover mounting base 6 via the sliding member 9 and can pivot freely with the support shafts 10 as a center.

Moreover, as mentioned above, the engagement surfaces of the bearing holes 5a and support shafts 10 are tapered. For example, when a strong external force is applied in a direction in which the lens cover 5 is opened, the support shafts 10 sink into the projection 9a against the constraining force of the spring 14. Consequently, the lens cover 5 is decoupled from the sliding member 9.

As shown in FIG. 3, a click ditch 5b that is locked by the click boss 11 of the sliding member 9 when the lens cover 5 is closed is formed in the lower inner surface of the jutting portion 5f.

Moreover, a click ditch 5bb (See FIGS. 11 and 12) that is locked by the click boss 11 of the sliding member 9 when the lens cover 5 is opened is formed in the bottom of the jutting portion 5f, though it is not shown in FIG. 3.

When the lens cover 5 is moved to the closed position, the click boss 11 of the sliding member 9 is locked in the click ditch 5b. When the lens cover 5 is moved to the open position, the click boss 11 is locked in the click ditch 5bb. Thus, a click stop mechanism for retaining the lens cover 5 at the closed position or open position on a stable basis is realized.

Figure 4:
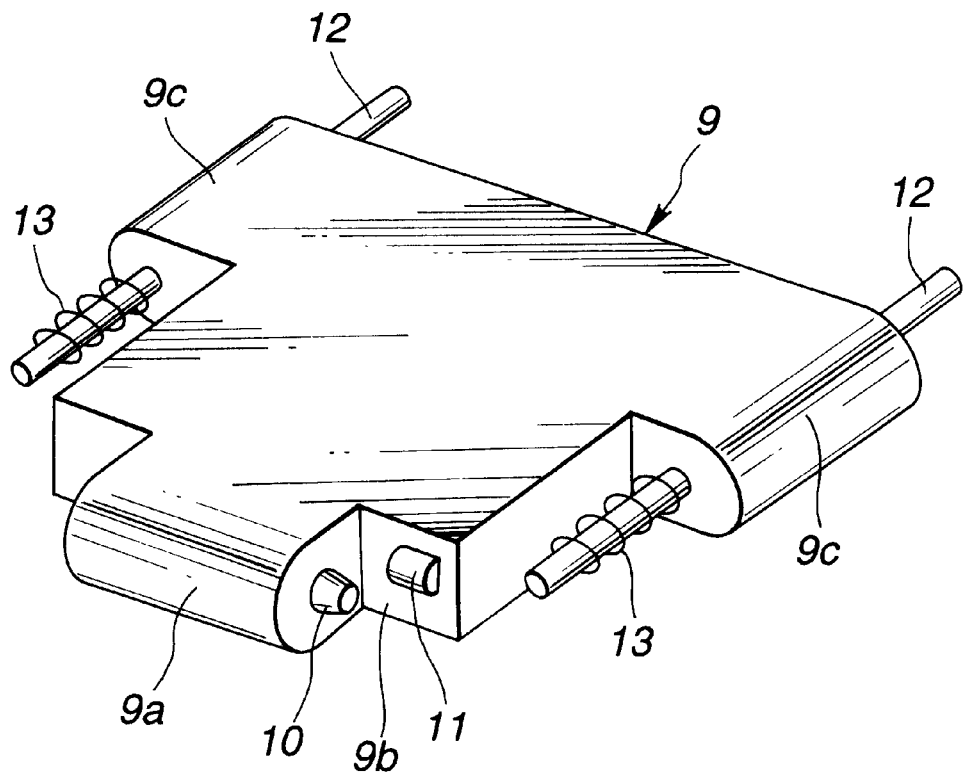
FIG. 4 is an enlarged oblique view showing a major portion of the camera shown in FIG. 1 which includes a coupling member for coupling a lens cover with a cover mounting base.

By the way, as shown in FIG. 4, through-holes extending parallel to the optical axis of the photography lens 7a are present in edges 9c of the sliding member 9 which are jutting right and left from the back half of the sliding member 9. Spindles 12 are penetrated through the through-holes.

The edges 9c are inserted into the cover mounting base 6, and the ends of the spindles 12 are locked in the cover mounting base 6. A stretchable coil spring 13 is wound about each of the front portions of the spindles 12, whereby the sliding member 9 is always constrained to move toward the back end of the cover mounting base 6 (toward the camera body 1).

Figure 6:
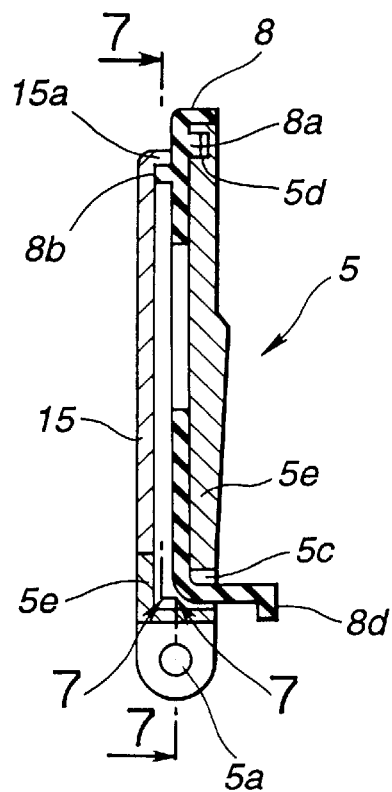
FIG. 6 is an enlarged longitudinal sectional view of the lens cover of the camera shown in FIG. 1.

The lens cover 5 is, as mentioned above, composed of the cover holder 5e, protecting member 15, and rubber cover 8. The detailed structure of the lens cover 5 is as shown in FIGS. 6 and 7.

Specifically, a ditch 5d is bored in the upper edge of the cover holder 5e. A convex portion 8a jutting out from the outer circumference of the rubber cover 8 is fitted into the ditch 5d filled with an adhesive or the like. Consequently, the cover holder 5e of the lens cover 5 and the rubber cover 8 are firmly secured to each other using the adhesive.

Moreover, a rib 8b jutting from the face of the cover 8 is formed in the upper edge of the rubber cover 8. The rib 8b is engaged with an outermost circumference 15a of the protecting member 15. The lower end of the protecting member 15 is fixed to the cover holder 5e.

As mentioned above, the protecting member 15, cover holder 5e, and rubber cover 8 are united.

In a space defined by the protecting member 15, cover holder 5e, and rubber cover 8, a ring portion 8c formed substantially in the center of the rubber cover 8 is stowed. Part of the rubber cover 8 is extends downward from the ring portion 8c. The extension 8d is extends to the exterior through a hole 5c bored in the cover holder 5e. The extension 8d that is an integral part of the rubber cover 8 and formed with an elastic member extends toward the optical axis of the photography lens 7a, and is, as shown in FIG. 3, attached to the front end of the cover mounting base 6. The extension 8d fills the role of a linkage member for coupling the lens cover 5 with part of the camera body 1.

Now, an attaching means used to attach the rubber cover 8 to the cover mounting base 6 will be described in conjunction with FIGS. 8 to 10.

Figure 8:
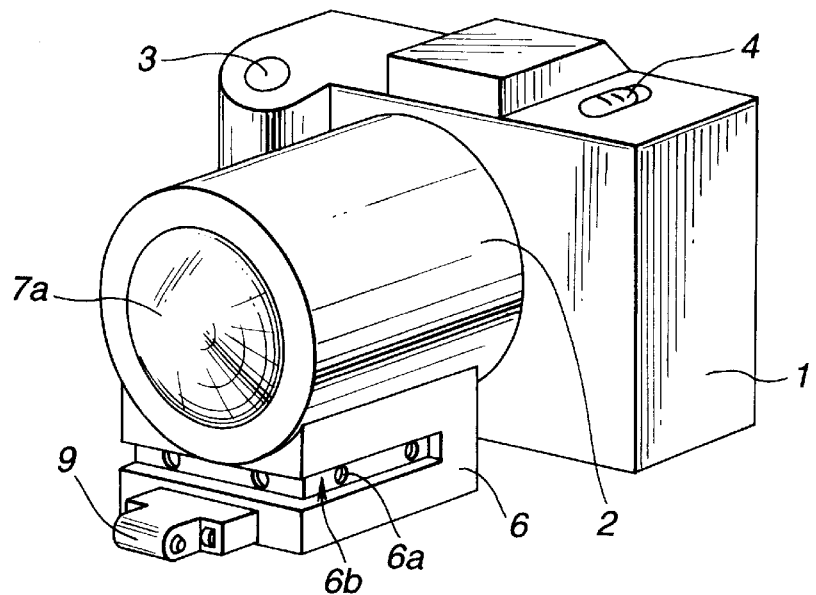
FIG. 8 is an oblique view schematically showing the structure of an attaching means for attaching a rubber cover to the cover mounting base in the camera shown in FIG. 1.
Figure 9:
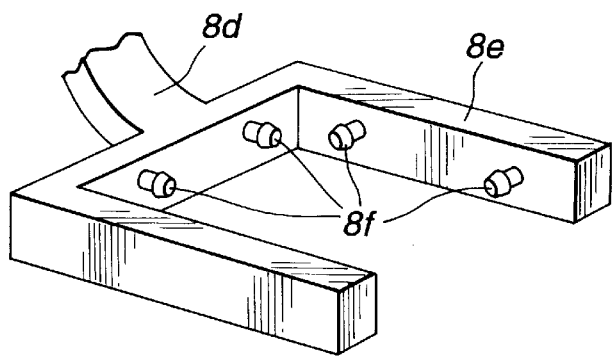
FIG. 9 is an enlarged oblique view showing a major portion of the camera shown in FIG. 1 which includes a rubber cover attachment portion.

As shown in FIG. 8, the cover mounting base 6 has a groove 6b continuous over at least three side walls of the cover mounting base 6; the front face and right and left sides thereof. A plurality of holes 6a are bored in the inner wall of the groove 6b.

Moreover, an attachment portion 8e shaped like a channel is formed at the distal end of the extension 8d of the rubber cover 8 so that the attachment portion can be engaged with the groove 6b of the cover mounting base 6. The attachment portion 8e is formed with a rubber made into the extension 8d, that is, an elastic member. The attachment portion 8e may be formed as an integral part of the rubber cover or may be formed as a separate unit and connected to the rubber cover. A plurality of bosses 8f are embedded at positions, which coincide with the plurality of holes 6a in the cover mounting base 6, in the inner walls of the attachment portion 8e.

Figure 10:
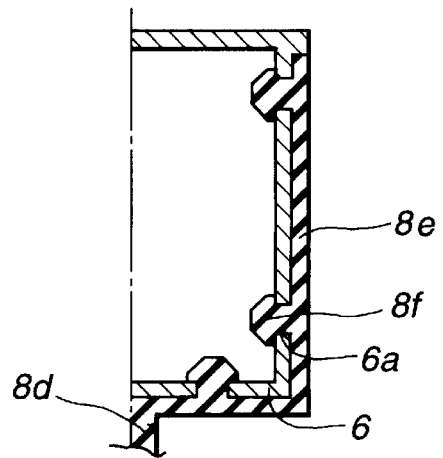
FIG. 10 is an enlarged sectional view showing a coupled state of the rubber cover and cover mounting base of the camera shown in FIG. 1.

As shown in FIG. 10, when the plurality of bosses 8f of the attachment portion 8e are fitted into the plurality of holes 6a of the cover mounting base 6, the lens cover 5 is connected to the mounting base 6 via the cover rubber cover 8.

Incidentally, the heads of the bosses 8f have a larger diameter than the holes 6a, and the circumferences of the heads are tapered. The heads are deformed due to the elasticities thereof and fitted into the holes 6a. Consequently, the bosses 8f are reliably fitted into the holes 6a and cannot be removed readily.

The operation of the camera of the embodiment having the foregoing components will be described.

Figure 11:
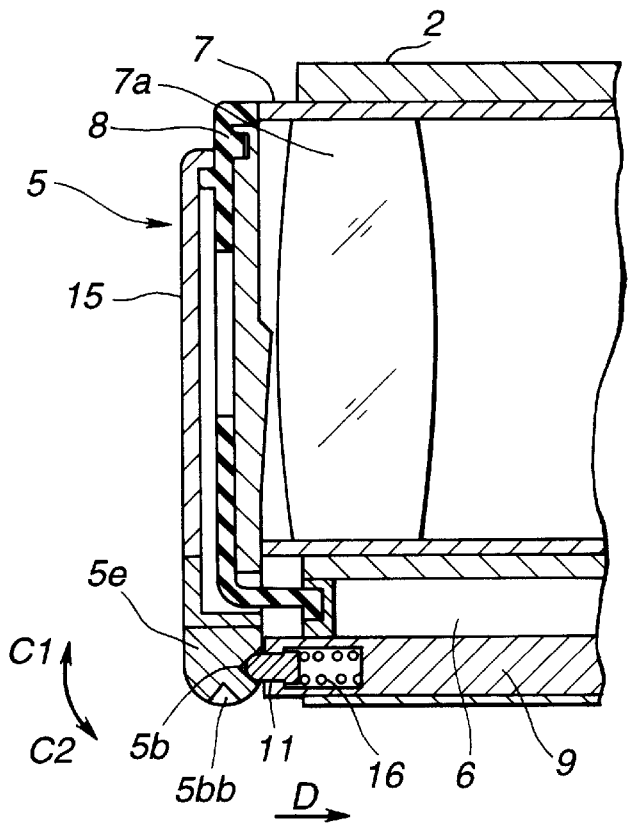
FIG. 11 is an enlarged sectional view showing a major portion of the camera shown in FIG. 1 which includes the lens cover and its surroundings with the lens cover closed.
Figure 12:
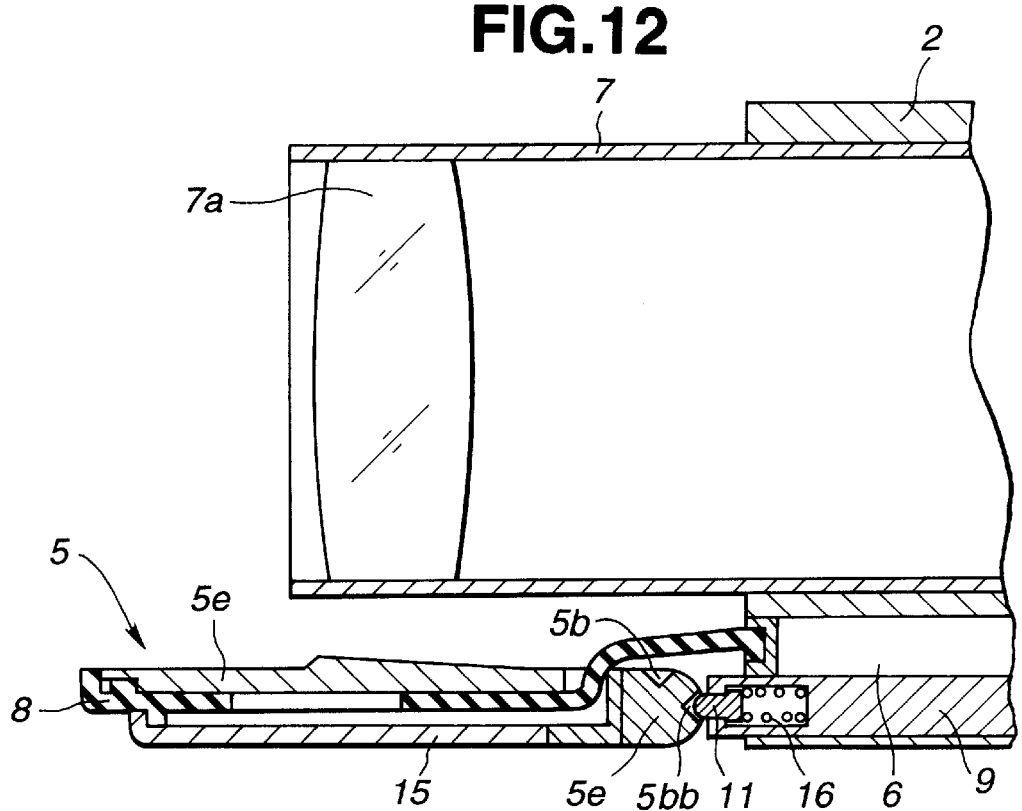
FIG. 12 is an enlarged sectional view showing the major portion of the camera shown in FIG. 1 which includes the lens cover and its surroundings with the lens cover held open.

FIGS. 11 and 12 are enlarged sectional views showing a major portion of the camera of the embodiment, which includes a lens cover and its surroundings, in enlargement. FIG. 11 shows a state in which the camera is brought to the non-photographic state, the moving lens barrel 7 of the fixed lens barrel 2 is collapsed, and the lens cover 5 is closed to shield the face of the fixed lens barrel 2. FIG. 12 shows a state in which the camera is brought to the photographic state, the moving lens barrel 7 of the fixed lens barrel 2 is thrust, and the lens cover 5 is opened to expose the face of the fixed lens barrel 2. FIGS. 11 and 12 are sectional views showing a plane passing through the center of the click boss 11.

As shown in FIGS. 1 and 11, when the lens cover 5 is closed, the click boss 11 constrained by the compression spring 16 is, as mentioned above, locked in the click ditch 5b bored in the jutting portion 5f of the lens cover 5. Consequently, the lens cover 5 is retained at the closed position on a stable basis, and constrained to pivot in a direction of arrow C1 in FIG. 11. This causes the rubber cover 8 of the lens cover 5 to abut on the face of the moving lens barrel 7. Thus, the face of the moving lens barrel 7 is shielded perfectly.

In this state, when the main power switch 4 of the camera is slided in a direction of arrow X1 in FIG. 1 in order to turn on the camera, the camera enters a state shown in FIGS. 2 and 12.

Specifically, responsively to the sliding of the main power switch 4, the moving lens barrel 7 starts moving along the optical axis of the photography lens 7a owing to a driving mechanism (not shown) incorporated in the camera body 1, and thus moves from the collapsed position for non-photography to the thrust position for photography. At this time, the lens cover 5 is pressed forward of the camera by the face of the moving lens barrel 7, and therefore pivots in a direction of arrow C2 in FIG. 11 with the support shafts 10 as a center. The click boss 11 is then pressed in a direction of arrow D in FIG. 11 against the constraining force of the compression spring 16. Eventually, the click boss 11 is disengaged from the click ditch 5b.

When the lens cover 5 is further pressed to pivot, the click boss 11 is engaged with the click ditch 5bb. The lens cover 5 is retained at this position, that is, the open position on a stable basis. Thus, the camera is brought to the photographic state shown in FIGS. 2 and 12.

By contrast, for changing the camera from the photographic state (state shown in FIGS. 2 and 12) to the non-photographic state (state shown in FIGS. 1 and 11), the main power switch 4 of the camera is slided in a direction of arrow X2 in FIG. 2 in order to turn off the camera. This causes the moving lens barrel 7 to move from the thrust position for photography to the collapsed position for non-photography. At this time, the tip of the lens cover 5 is pressed by a finger or the like. This causes the lens cover 5 to pivot from the open position to the closed position. The click boss 11 is pressed against the constraining force of the compression spring 16, whereby the clock boss 11 is disengaged from the click ditch 5bb. When the lens cover 5 is further moved to pivot, the click boss 11 is engaged with the click ditch 5b. The lens cover 5 is then retained at the closed position on a stable basis, and the camera is brought to the non-photographic state shown in FIGS. 1 and 11.

As far as a camera for carrying out photography is concerned, accessories used for photography, for example, a filter used to give special effects or remove harmful light rays may be attached to the face of a moving lens barrel. Some kind of filter is attached to the face of the moving lens barrel during photography without fail in order also to protect the face of a photography lens.

After completion of photography, when the camera is preserved or carried, the lens cover must be closed. If a frequently-used filter or the like must be detached every time the lens cover is closed, it is annoying.

Even when the filter or the like remains attached to the face of the moving lens barrel, if the lens cover can be closed without any hindrance, it is convenient.

The camera of this embodiment has taken account of this point. To be more specific, in the state shown in FIG. 11, that is, when a filter or the like is not attached to the face of the moving lens barrel 7, the ring portion 8c of the rubber cover 8 is substantially circular as shown in FIG. 7.

Figure 13:
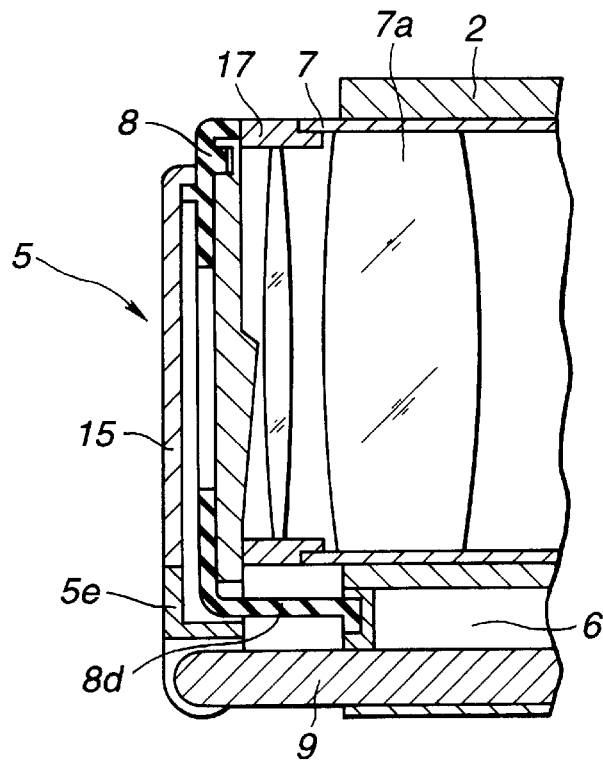
FIG. 13 is an enlarged sectional view showing the major portion of the camera shown in FIG. 1 which includes the lens cover and its surroundings in a state in which a filter is attached to the face of a moving lens barrel of a fixed lens barrel and the camera is brought to non-photographic state.
Figure 14:
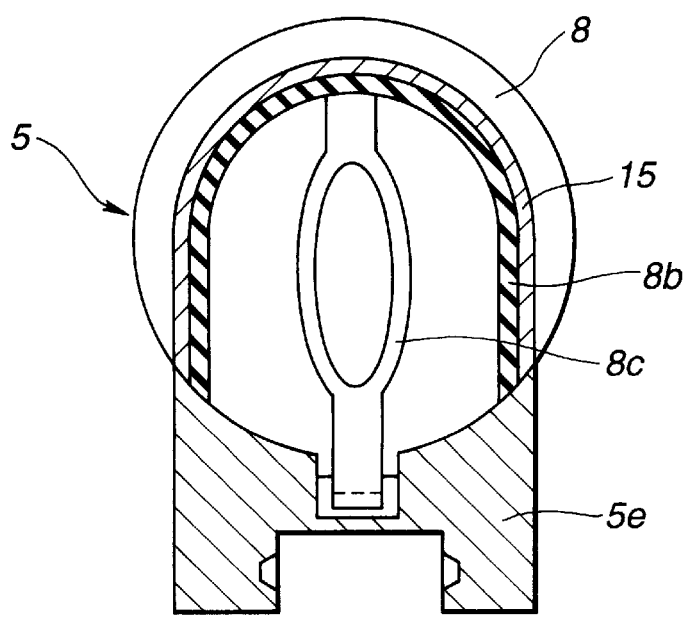
FIG. 14 is a sectional view of the lens cover alone extracted from the camera in the state shown in FIG. 13.

FIG. 13 is an enlarged sectional view showing a major portion of the camera which includes the lens cover and its surroundings in a state in which a filter 17 is attached to the face of the moving lens barrel 7 in the fixed lens barrel 2 and the camera is brought to the non-photographic state. FIG. 14 is a sectional view showing the lens cover alone in a state in which a plane cuts through the lens cover in the same manner as that shown in FIG. 7 (FIG. 11). Like the state shown in FIG. 11, in the state shown in FIG. 13, the moving lens barrel 7 in the fixed lens barrel 2 is collapsed, and the lens cover 5 is closed to shield the face of the fixed lens barrel 2.

In the state shown in FIG. 13, that is, when the filter 17 is attached to the face of the moving lens barrel 7, if the lens cover 5 is closed, since the sliding member 9 can freely slide as mentioned above, the sliding member 9 moves forward of the camera by a distance corresponding to the thickness of the filter 17. In this case, the extension 8d of the rubber cover 8 stretches by a magnitude corresponding to the thickness of the filter 17. The magnitude of stretch is, as shown in FIG. 14, absorbed by the stretch of the ring portion 8c deriving from the elastic deformation thereof.

The lens cover 5 of the camera can be closed without any hindrance irrespective of whether or not the filter 17 is present.

In the state shown in FIG. 13, that is after the lens cover 5 is closed with the filter 17 held attached, the camera is used by opening the lens cover 5 again, and then the filter 17 is detached from the face of the moving lens barrel 7, when the lens cover 5 is closed, the ring portion 8c is reset to the original circular shape shown in FIG. 7 owing to the elasticity of the rubber cover 8 it self. Thus, the length of the rubber cover 8 is automatically adjusted.

Figure 15:
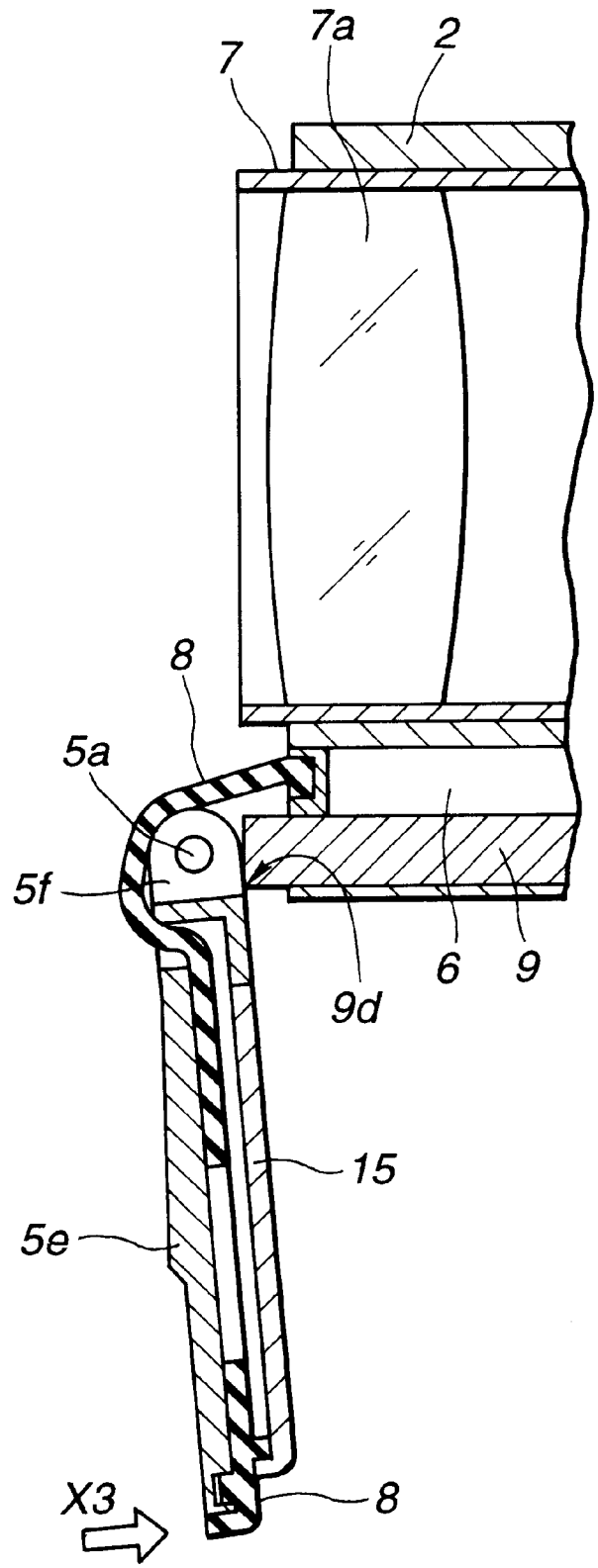
FIG. 15 is an enlarged sectional view showing a major portion of the camera shown in FIG. 1 in a state in which a strong external force is applied to the lens cover with the lens cover held open.

Next, assuming that the camera is in use, the lens cover 5 is open, and then a strong external force is applied to the lens cover 5, the operation of the camera will be described in conjunction with FIG. 15.

When the lens cover is open, the click boss 11 forming the click stop mechanism is, as mentioned above, locked in the click ditch 5bb (See FIGS. 2 and 12). In this state, when a strong external force is applied to the lens cover 5 counterclockwise (direction of arrow C2 in FIG. 11) with the support shafts 10 as a center, the click boss 11 is disengaged from the click ditch 5bb. The state shown in FIG. 15 is then established.

In this case, when the lens cover 5 further pivots in a direction of arrow X3, the outer wall surface of the jutting portion 5f of the lens cover 5 abuts on an angular part 9d of the sliding member 9 at the front end thereof. The lens cover then pivots with the angular part 9d as a fulcrum. Consequently, the support shafts 10 are disengaged from the bearing holes 5a, and the lens cover 5 is decoupled from the sliding member 9. The coupler for coupling the lens cover 5 with the sliding member 9 will therefore not be broken.

When the lens cover 5 comes off from the sliding member 9, if a photographer carelessly grabs the lens cover 5 alone to hang the camera body 1, an excessive external force is applied to the lens cover 5. Even in this case, as far as the camera of this embodiment is concerned, since the rubber cover 8 is, as mentioned above, reliably attached to the cover mounting base 6 (See FIGS. 3, 8, and 9), the lens cover 5 will not be completely separated from the camera body 1. Consequently, a drawback that the camera body 1 alone drops and is broken will not take place.

As described so far, according to the embodiment, when the camera is brought to the photographic state and the lens cover 5 is opened, the lens cover 5 withdraws to lie under the moving lens barrel 2. The operability of the camera for photography will not be impaired.

Moreover, when the camera is carried or used with the lens cover 5 held open, if the lens cover 5 that is open hits at something or the camera is carelessly held by grabbing the lens cover 5 alone, an excessive external force is applied to the lens cover 5. Even in this case, the coupler for coupling the lens cover 5 with the camera and the camera body 1 can be prevented from being broken.

Even with an accessory such as the filter 17 attached to the face of the moving lens barrel 7, the lens cover 5 can be closed in order to shield the face of the moving lens barrel 7 without any hindrance. Irrespective of whether or not an accessory such as a filter is attached, the face of the photography lens 7a can be protected by the lens cover 5.

According to the present invention, it is apparent that a wide range of different embodiments can be constructed on the basis of the invention without a departure from the spirit and scope of the invention. This invention will be limited to the appended claims but not restricted to any specific embodiment.

What is claimed is:

1. A camera having a pivotally mounted lens cover for a movable lens barrel capable of being separated from the lens barrel upon the occurrence of an external force to protect the coupling mechanism from breakage, comprising:

a camera body;

a fixed lens barrel on said camera body including a moving lens barrel movable between a collapsed position for non-photography and to a thrust position for photography;

a lens cover pivotally mounted upon support shafts, which lie parallel to a plane substantially perpendicular to an optical axis of a photography lens, as a center so as to move between a closed position at which at least part of the face of said photography lens is shielded and an open position at which the face of said photography lens is exposed; and a linkage member in addition to the lens cover, which is pivoted about the support shafts provided along the barrel, said lens cover being coupled with part of a camera body by the linkage member, wherein when said lens cover is open, if an external force is applied in a direction in which said lens cover if further opened, said lens cover comes off from said support shaft, and even at this time, said lens cover is coupled with part of the camera body by linkage member.

2. A camera according to claim 1, wherein said support shaft is movable in a direction of its longitudinal axis, and is constrained in a direction to engage said lens cover, and when said lens cover separates from said support shaft, said support shaft is moved against the constraining force in the direction of its axis.

3. A camera according to claim 1, wherein said linkage member is formed of an elastic member.

4. A camera according to claim 1, comprising:

a click mechanism including a click ditch and a click boss which is constrained to engage the click ditch, for holding the lens cover at a predetermined position; and a cover mounting base having said support shaft, which incorporates one of said click ditch and click boss;

wherein said lens cover which is at one of the opened position and the closed position incorporates the other of said click ditch and click boss, and said lens cover is pressed by the moving lens barrel that moves to the thrust position for photography and retained at the open position by the click mechanism.

5. A camera according to claim 4, wherein, when the lens cover separates from the support shaft, the click ditch and the click boss of said click mechanism are separated from each other, thereby to cease their function.

6. A camera according to claim 1, further comprising:

a supporting member for supporting said support shafts so that said support shafts can move relative to the lens barrel along the optical axis of said photography lens.

7. A camera according to claim 1, further comprising:

a supporting member for supporting said support shafts of the lens cover so as to be able to move together with said supports shafts along the direction of the optical axis of the photography lens; and means for constraining said supporting member to move along the optical axis of the photography lens towards said camera.

8. A camera, comprising:

a camera body;

a fixed lens barrel on said camera body including a moving lens barrel moveable to a collapsed position for non-photography and to a thrust position for photography; and a lens cover capable of pivoting with support shafts, which lie parallel to a plane substantially perpendicular to an optical axis of a photography lens, as a center so as to move to a closed position at which at least part of a face of said photography lens is shielded and to an open position at which the face of said photography lens is exposed, wherein when said lens cover is open, if an external force is applied in a direction in which said lens cover is further opened, said lens cover separates from said support shafts;

said lens cover being coupled with part of said camera body by a linkage member; and said linkage member having an elastically-deforming portion embedded in a portion of said lens cover for shielding the face of said photography lens.

9. A camera having a pivotally mounted lens cover for a moveable lens barrel capable of being separated from the lens barrel upon the occurrence of an external force to protect the coupling mechanism from breakage, comprising:

a camera body:

a fixed lens barrel on said camera body including a moving lens barrel movable to a collapsed position for non-photography and to a thrust position for photography;

a lens cover capable of pivoting with support shafts, which lie parallel to a plane substantially perpendicular to an optical axis of a photography lens, as a center so as to move to a closed position at which at least part of a face of said photography lens is shielded and to an open position at which the face of said photography lens is exposed, and a means for, when said lens cover is open, if an external force is applied in a direction in which said lens cover is further opened, decoupling said lens cover from said support shafts;

a linkage member in addition to the lens cover, which is pivoted about the support shafts provided along the barrel, said lens cover being coupled with part of said camera body by the linkage member, wherein when said lens cover is open, if an external force is applied in a direction in which said lens cover if further opened, said lens cover comes off from said support shaft, and even at this time, said lens cover is coupled with part of the camera body by the linkage member.

10. A camera having a pivotally mounted lens cover for a moveable lens barrel capable of being separated from the lens barrel upon the occurrence of an external force to protect the coupling mechanism from breakage, comprising:

a camera body:

a fixed lens barrel on said camera body including a moving lens barrel movable to a collapsed position for non-photography and to a thrust position for photography;

support shafts lying in a vicinity of an outer circumference of said fixed lens barrel so as to extend along a tangent line of the outer circumference; and a lens cover, borne of said support shafts, capable of pivoting with said support shafts as a center so as to move to a closed position at which at least a face of said fixed lens barrel is shielded and to an open position at which the face of said fixed lens barrel is exposed, a linkage member in addition to the lens cover, which is pivoted about the support shafts provided along the barrel, said lens cover being coupled with part of said camera body by the linkage member, wherein when said lens cover is open, if an external force is applied in a direction in which said lens cover is further opened, said lens cover separates from said supports shafts and even at this time, said lens cover is coupled with part of the camera body by the linkage member.

11. A camera according to claim 10, wherein said support shaft is moveable in the direction of its longitudinal axis, and also constrained in the direction to engage said lens cover, and when said lens cover separates from said support shaft, said support shaft is moved against the constraining force in the direction of its axis.

12. A camera according to claim 10,
wherein said linkage member is formed of an elastic member.

13. A camera according to claim 10, comprising:
a click mechanism including a click ditch and a click boss which is constrained to engage the click ditch, for holding the lens cover at a predetermined position; and
a cover mounting base having said support shaft, which includes one of said click ditch and click boss;
wherein said lens cover, which is at one of the opened position and the closed position includes the other of said click ditch and click boss, and said lens cover is pressed by the moving lens barrel that moves to the thrust position for photography and retained at the open position by the click mechanism.

14. A camera according to claim 13,
wherein, when the lens cover separates from the support shaft, the click ditch and the click boss of said click mechanism are separated from each other, thereby to cease to function.

15. A camera according to claim 10, further comprising:
a supporting member for supporting said support shafts so that said support shafts can move relative to the lens barrel along the optical axis of said photography lens.

16. A camera according to claim 10, further comprising:
a supporting member for supporting said support shafts of the lens cover so as to be able to move together with said support shafts along the direction of the optical axis of the photography lens; and means for constraining said supporting member to move along the optical axis of the photography lens towards said camera.

17. A camera having a pivotally mounted lens cover for a moveable lens barrel capable of being separated from the lens barrel upon the occurrence of an external force to protect the coupling mechanism from breakage, comprising:
a camera body;
a fixed lens barrel on said camera body including a moving lens barrel movable to a collapsed position for non-photography and to a theist position for photography;
support shafts lying in a vicinity of an outer circumference of said fixed lens barrel so as to extend substantially perpendicularly to an optical axis of a photography lens; and
a lens cover, borne by said support shafts, capable of pivoting with said support shafts as a center so as to move between a closed position at which at least a face of said fixed lens barrel is shielded and between an open position at which the face of said fixed lens barrel is exposed, and
a linkage member in addition to the lens cover, which is pivoted about the support shafts provided along the barrel, said lens cover being coupled with part of said camera body by the linkage member,
wherein when said lens cover is open, if an external force is applied in a direction in which said lens cover is further opened, said lens cover separates from said support shafts and even at this time, said lens cover is coupled with part of the camera body by the linkage member.

18. A camera having a pivotally mounted lens cover for a moveable lens barrel capable of being separated from the lens barrel upon the occurrence of an external force to protect the coupling mechanism from breakage, comprising:
a camera body:
a fixed lens barrel on said camera body, including a moving lens barrel movable to a collapsed position for non-photography and to a thrust position for photography; and
a lens cover capable of pivoting with a center of rotation, which is defined parallel to a plane substantially perpendicular to an optical axis of said photography lens, as a center so as to move t o a closed position at which at least part of a face of said photography lens is shielded and to a closed position at which the face of said photography lens is exposed;
a linkage member in addition to the lens cover, which is pivoted about the support shafts provided along the barrel, said cover being coupled with part of said camera body by the linkage member,
wherein when said lens cover is open, if an external force is applied in a direction in which said lens cover is further opened, said lens cover separates from said said support shaft, and even at this time, said lens cover is coupled with part of the camera body by the linkage member.

19. A camera having a pivotally mounted lens cover for a moveable lens barrel capable of being separated from the lens barrel upon the occurrence of an external force to protect the coupling mechanism from breakage, comprising:
a camera body;
a fixed lens barrel on said camera body including a moving lens barrel movable to a collapsed position for non-photography and to a thrust position for photography;
a lens cover capable of pivoting with a center of rotation, which is defined parallel to a plane substantially perpendicular to an optical axis of a photography lens, as a center so as to move to a closed position at which at last part of a face of said photography lens is shielded and to an open position at which the face of said photography lens is exposed; and
a linkage member in addition to the lens cover, which is pivoted about the support shafts provided along the barrel, said cover being coupled with part of said camera body by the linkage member,
a means for, when said lens cover is open, if an external force is applied in a direction in which said lens cover is further opened, displacing said lens cover from said support shaft, and even at this time, said lens cover is coupled with part of the camera body by the linkage member.

20. A camera according to claim 19,
wherein said linkage member is formed of an elastic member.

21. A camera according to claim 19,
wherein said linkage member has an elastically-deforming portion embedded in a portion of said lens cover for shielding the face of said photography lens.

22. A camera according to claim 19, further comprising:
a supporting member for supporting said support shafts so that said support shafts can move relative to the lens barrel along the optical axis of said photography lens.

23. A camera according to claim 19, further comprising
a supporting member for supporting said support shafts of the lens cover so as to be able to move together with said support shafts along the direction of the optical axis of the photography lens; and means for constraining said supporting member to move along optical axis of the photography lens toward said camera.

24. A camera having a pivotally mounted lens cover for a moveable lens barrel capable of being separated from the lens barrel upon the occurrence of an external force to protect the coupling mechanism from breakage, comprising:

a camera body a fixed lens barrel on said camera body including a moving lens barrel movable to a collapsed position for non-photography and to a thrust position for photography;

a center of rotation defined in a vicinity of an outer circumference of said fixed lens barrel in such a manner that said center of rotation works along a tangent line of the outer circumference;

a lens cover, borne at said center of rotation, capable of pivoting with said center of rotation as a center so as to move to a closed position at which at least a face of said fixed lens barrel is shielded and to an open position at which the face of said fixed lens barrel is exposed; and a linkage member in addition to the lens cover, which is pivoted about the support shafts provided along the barrel, said cover being coupled with part of said camera body by the linkage member, wherein when said lens cover is open, if an external force is applied in a direction in which said lens cover is furtherer opened, said lens cover is displaced from said support shaft, and even at this time, said lens cover is coupled with part of the camera body by the linkage member.

25. A camera according to claim 24, wherein said linkage member is formed of an elastic member.

26. A camera a camera body according to claim 24, wherein said linkage member has an elastically-deforming portion embedded in a portion of said lens cover shielding the face of said photography lens.

27. A camera according to claim 24, further comprising:

a supporting member for supporting, said support shafts so that said support shafts can move relative to the lens barrel along the optical axis of said photography lens.

28. A camera according to claim 24, further comprising:

a supporting member for supporting said support shafts of the lens cover so as to be able to move together with said support shafts along the direction of the optical axis of the photography lens; and means for constraining said supporting member to move backward along the optical axis of the photography lens.

29. A camera having a pivotally mounted lens cover for a moveable lens barrel capable of being separated from the lens barrel upon the occurrence of an external force to protect the coupling mechanism from breakage, comprising:

a camera body;

a fixed lens barrel on said camera body including a moving lens barrel movable to a collapsed position for non-photography and to a thrust position for photography;

a center of rotation defined in a vicinity of an outer circumference of said fixed lens barrel in such a manner that said center of rotation works substantially perpendicularly to an optical axis of a photography lens; and a lens cover, borne at said center of rotation, capable of pivoting with said center of rotation as a center so as to move to a closed position at which at least a face of said fixed lens barrel is shielded and to an open position at which the face of said fixed lens barrel is exposed, a linkage member in addition to the lens cover, which is pivoted about the support shafts provided along the barrel, said cover being coupled with part of said camera body by the linkage member, wherein when said lens cover is open, if an external force is applied in a direction in which said lens cover is further opened, said lens cover is displaced from said support shaft, and even at this time, said lens cover is coupled with part of the camera body by the linkage member.

30. A camera, comprising:

a camera body;

a fixed lens barrel on said camera body including a moving lens barrel moveable to a collapsed position for non-photography and to a thrust position for photography; and a lens cover pivoting upon support shafts, which lie parallel to a plane substantially perpendicular to an optical axis of a photography lens, as a center so as to move between a closed position at which at least part of a face of said photography lens is shielded and an open position at which the face of said photography lens is exposed, wherein when said lens cover is open, if an external force is applied in a direction in which said lens cover is further opened, said lens cover separates from said support shafts;

a support member external of said fixed lens barrel and movable in a direction along the optical axis for supporting said support shafts, enabling said lens cover to accommodate a member mounted upon a front of the lens barrel when the lens cover is closed.

* * * * *